United States Patent [19]
Smith

[11] 3,900,007
[45] Aug. 19, 1975

[54] AUTOMATIC ANIMAL FOOD DISPENSER

[76] Inventor: Fenter Willie Smith, 1133 Coronado Ave., West Covina, Calif. 91790

[22] Filed: Jan. 11, 1974

[21] Appl. No.: 432,753

[52] U.S. Cl. .......................................... 119/51.13
[51] Int. Cl.² ......................................... A01K 5/02
[58] Field of Search ............. 119/51.11, 51.13, 51.5

[56] References Cited
UNITED STATES PATENTS
3,741,162  6/1973  Lopez ................................ 119/51.5
3,762,373  10/1973  Grossman ....................... 119/51.11

Primary Examiner—Hugh R. Chamblee
Attorney, Agent, or Firm—Boniard I. Brown

[57] ABSTRACT

An automatic animal food dispenser for dispensing a quantity of food into a feeding receptacle periodically at predetermined regular intervals. The food is stored in separate compartments of a food container which is mounted on a frame for movement of the compartments in succession to a food dispensing position wherein the contents of each compartment is emptied or dispensed into the feeding receptacle through a bottom opening of the compartment and a dispensing opening in the frame. The food container is driven by a motor under the control of a timer circuit which periodically energizes the motor to drive the next food filled compartment to dispensing position and deenergizes the motor to arrest the container in response to arrival of the filled compartment at dispensing position.

7 Claims, 8 Drawing Figures

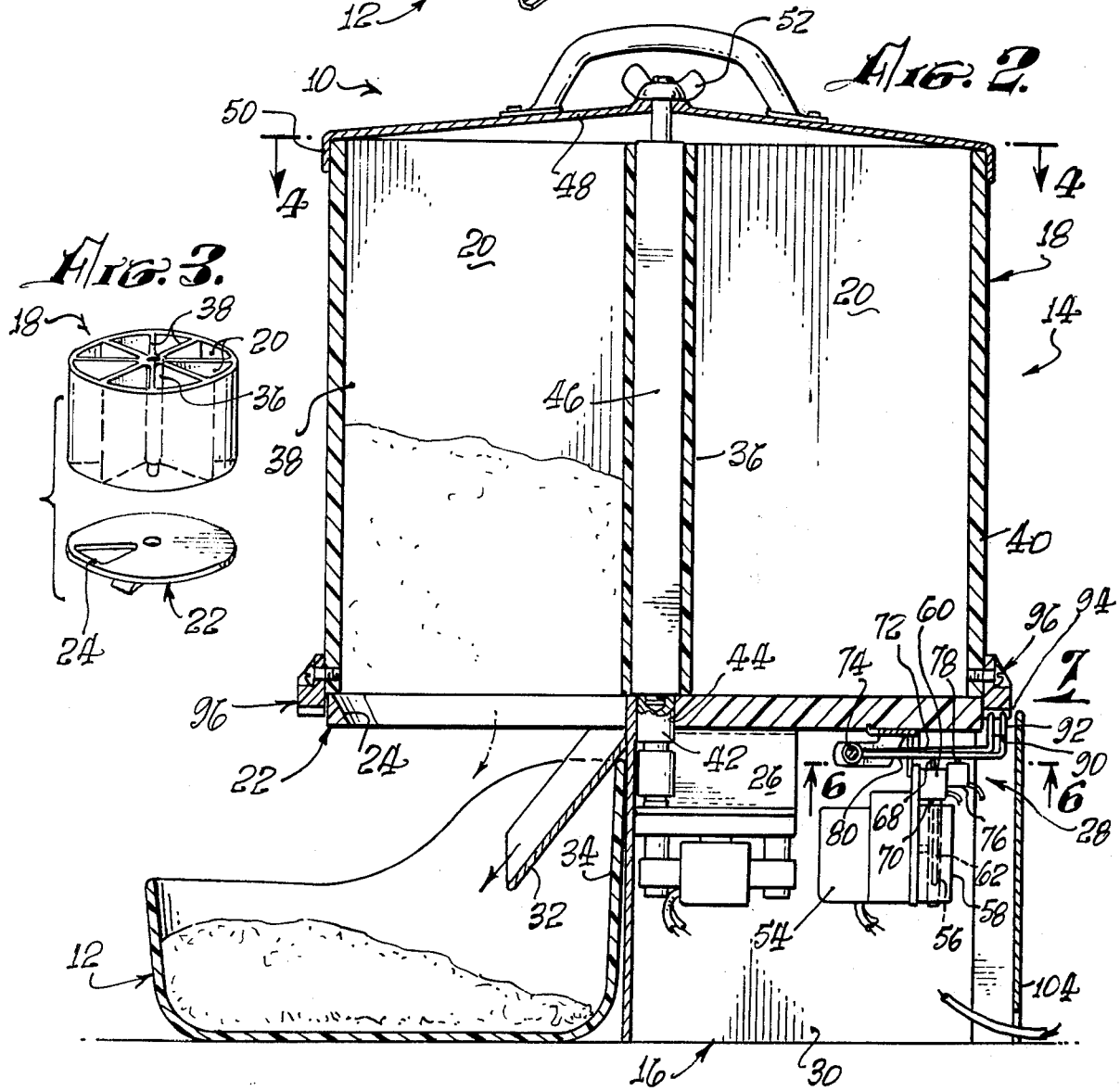

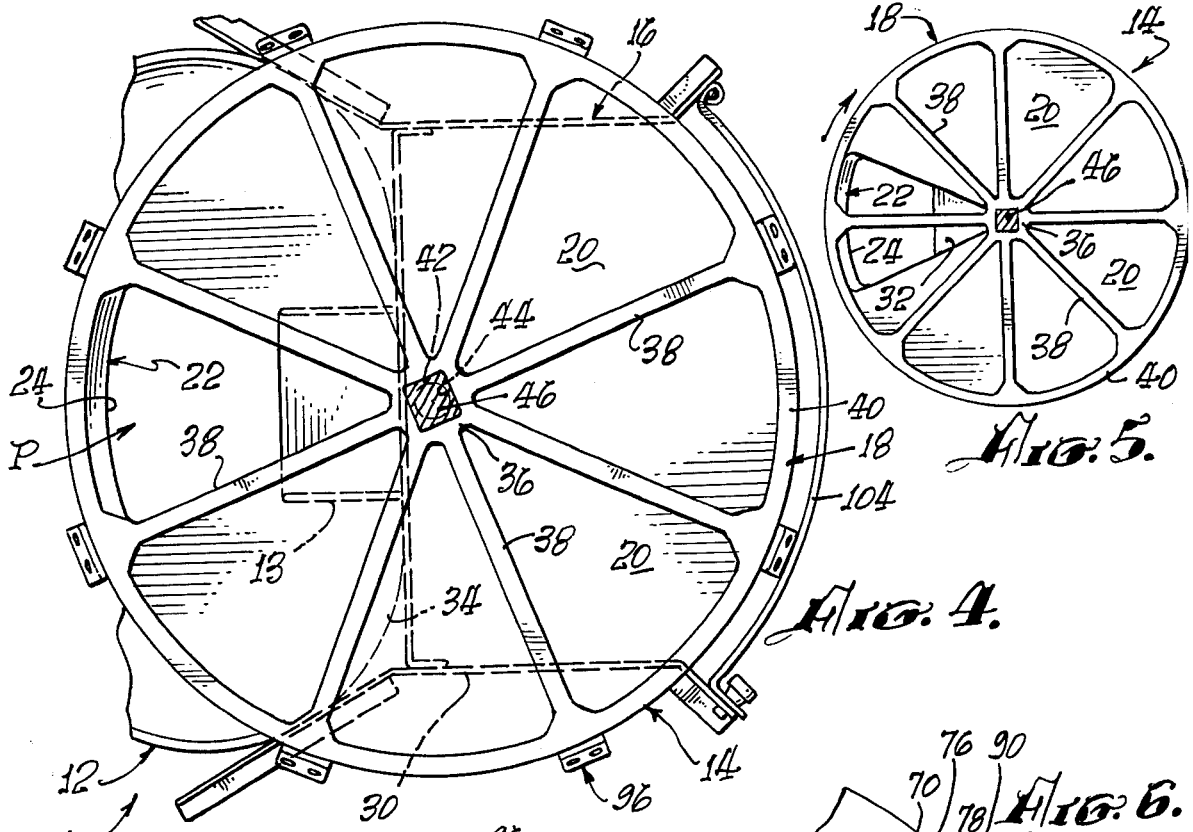
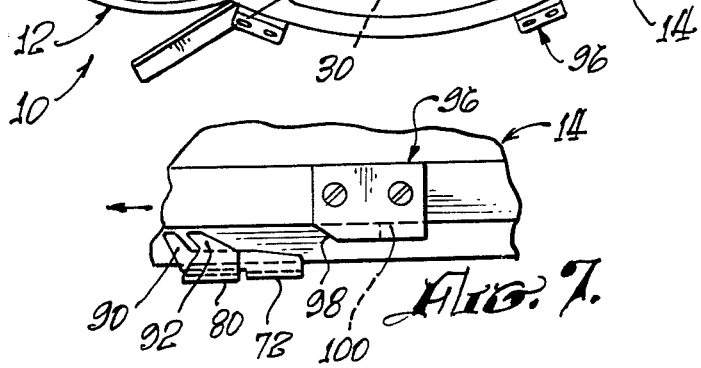
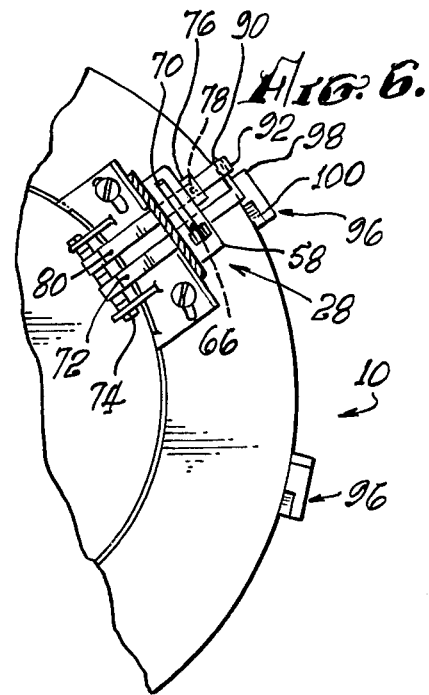
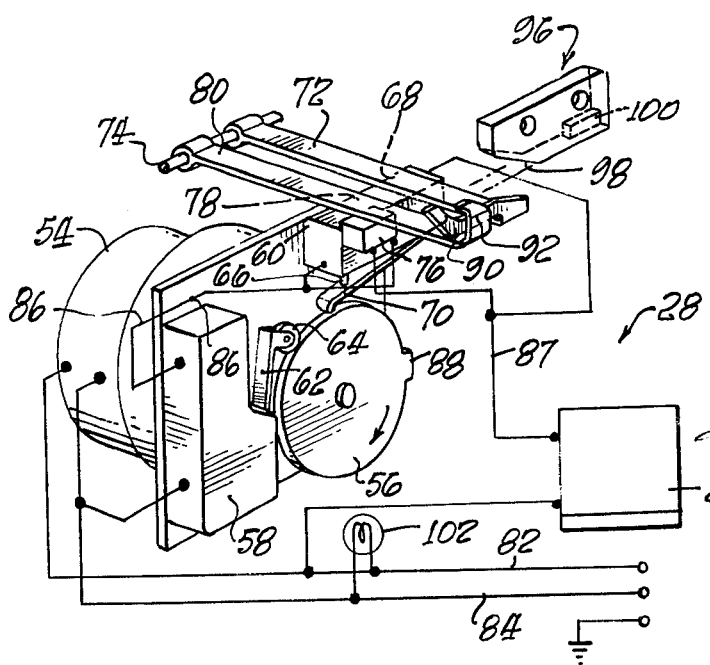

AUTOMATIC ANIMAL FOOD DISPENSER

BACKGROUND OF THE INVENTION

1. Field of the Invention

This invention relates generally to the field of animal care and more particularly to a novel automatic animal food dispenser for the automatic feeding of animals at predetermined timed intervals.

2. Discussion of the Prior Art

One of the daily tasks involved in pet ownership is feeding. This task tends to not only be somewhat tedious for the average pet owner but also presents a problem in those situations where the owner may be gone during the normal feeding time or may desire to leave the animals unattended for a period of days.

A variety of automatic animal feeders have been devised to alleviate these problems. Generally speaking, such automatic feeders comprise a feeding receptacle or dish and an automatic food dispenser for dispensing a quantity of animal food into the dish at regular periodic intervals, generally once per day. Examples of such automatic animal feeders are described in U.S. Pat. Nos. 911,674; 2,500,243; 2,791,984; 3,050,029; 3,340,851 and 3,658,036.

SUMMARY OF THE INVENTION

This invention provides an improved animal feeder and food dispenser of this character. The dispenser has a frame mounting a food container with several individual compartments for receiving a quantity of animal food, preferably dried food in the form of pellets, cubes, or the like. Each compartment has a bottom opening closed by a wall member on the frame containing a food dispensing opening. The container is movable relative to the frame in a manner such that the compartments are movable in succession through a food dispensing opening wherein the bottom opening of each compartment registers with the dispensing opening in the frame. Accordingly, as each compartment arrives in dispensing position, its contents is emptied or dispensed by gravity through the bottom opening of the compartment and the dispensing opening in the frame. A feeding receptacle or dish is positioned below the dispensing opening to receive the food thus dispensed through the opening.

The food container is driven by an electric motor mounted on the frame. This motor is controlled by a timer circuit which periodically energizes the motor at regular time or feeding intervals, such as once per day, to advance the following food filled compartment of the container to dispensing position. This timer circuit deenergizes the motor to arrest the container upon arrival of the following filled compartment at dispensing position. The motor remains deenergized to retain the now empty compartment in dispensing position until the timer circuit again energizes the motor upon expiration of the next feeding interval to advance the next filled compartment to dispensing position.

In the described preferred embodiment of the invention, the timer circuit includes switch means which are actuated by a clock or timer motor driven cam at the desired feeding intervals to energize the food container drive motor. The container mounts cams which actuate the switch means to deenergize the motor upon arrival of the next food filled compartment at dispensing position.

DESCRIPTION OF THE DRAWINGS

FIG. 1 is a perspective view of a preferred animal food dispenser and feeder according to the invention;

FIG. 2 is an enlarged section through the feeder;

FIG. 3 is an exploded perspective view on reduced scale of the compartmented food container and frame wall which closes the bottom openings of the container compartments;

FIG. 4 is a section taken on line 4—4 in FIG. 2;

FIG. 5 is a view similar to FIG. 4, on reduced scale and showing the container in the course of movement from one dispensing position to the next;

FIG. 6 is a section taken on line 6—6 in FIG. 5;

FIG. 7 is a view in the direction of the arrow 7 in FIG. 6; and

FIG. 8 is an electrical diagram of the feeder.

DESCRIPTION OF THE PREFERRED EMBODIMENT

The animal feeder 10 of the invention illustrated in the drawings comprises a feeding receptable or dish 12 and a food dispenser 14 for periodically dispensing a quantity of food, preferably dried food, into the dish at regular intervals, such as once per day. The food dispenser 14 has a frame 16 mounting a food container 18 with a number of separate compartments 20 for receiving food. These compartments are open at their bottom ends. Frame 16 has a wall member 22 directly under the food container 18 which closes the bottom openings of the container compartments 20. Extending through the wall member 22 is a food dispensing opening 24.

Food container 18 is movable relative to the frame 16 in a direction to effect movement of the compartments 20 in succession through a food dispensing position P (FIG. 4) wherein the bottom opening of each compartment registers with the dispensing opening. The food contents of the compartment then empties from the compartment through the dispensing opening into the feeding dish 12 which is located directly below the opening.

Food container 18 is driven by an electric motor 26 controlled by a timer circuit 28. This timer circuit energizes the motor 26 periodically at regular intervals, such as once per day, to advance a filled container compartment 20 to dispensing position where the compartment contents are emptied or dispensed into the feeding dish 12, as described above. The timer circuit is then actuated to deenergize the motor, leaving the now empty compartment in dispensing position until the circuit again energizes the motor to advance the following filled compartment to dispensing position.

Referring in more detail to the preferred embodiment illustrated, the dispenser frame 16 has a base 30 adapted to rest on the floor. This base is hollow and contains the food container drive motor 26 and timer circuit 28. The frame wall member 22 is a disc-shaped plate which is fixed to the base 30 in a generally horizontal position with the portion of the member containing the dispensing opening 24 projecting beyond one side of the base, as shown best in FIG. 2. The feeding receptacle or dish 12 is removably located at this side of the base, under the projecting portion of the plate 22 and directly below the dispensing opening 24. Extending from the underside of the plate 22, at the inner end of the opening 24, is a chute 32 which deflects food emerging through the opening to the outer side of the dish 12. The dish has an upstanding inner wall portion 34 which extends upwardly between the frame base 30 and chute 32 to retain the dish in position.

The food container 18 is cylindrical in form and has approximately the same outside diameter as the frame plate 22. Extending centrally through the container on its axis is a sleeve 36. Partitions 38 extend radially between and are rigidly joined to the sleeve 36 and the outer cylindrical wall 40 of the container to form its separate food compartments 20. The container is open at both its top and bottom ends. Food container 18 seats coaxially on the frame plate 22 which thus closes the open bottom ends of the container compartments 20.

As noted above, the food container drive motor 26 and timer circuit 28 are located in the follow frame base 30. Motor 26 is mounted on the underside of the frame plate 22 and drives an output shaft 42 through reduction gearing, not shown. Shaft 42 is aligned with the central axis of the frame plate and food container 18 and rotates in a bearing bore 44 in the plate. Threaded at its lower end to the shaft 42 is a square shaft 46 which extends upwardly through a square opening through the container sleeve 36 to provide a driving connection between the shaft and container. The shaft 46 may be sized to permit slidable removal of the container from the shaft.

The upper end of the container 18 is closed by a cover 48 having a peripheral flange 50 which fits snugly but removably over the upper end of the container to permit removal of the cover. If desired, the upper end of shaft 47 may extend through the cover 48 and may be secured to the cover by a wing nut 52 or the like to hold the food container 18 in position on the frame plate 22.

From the description to this point, it will be understood that the motor 26 drives the food container 18 through the shaft 46. During this rotation of the container, its food compartments 20 rotate in succession through a food dispensing position wherein the bottom openings of the compartments register with the food dispensing opening 24 in the frame plate 22. The container cover 48 is removable to fill the compartments with animal food.

Referring now particularly to FIGS. 4–8, the timing circuit 28 includes a clock or timer motor 54 driving a cam 56 which operates a motor start switch 58 and a reset switch 60. The clock motor and switches are mounted within the base 30, as shown in FIG. 1. Start switch 58 is a normally open switch having an actuator arm 62 mounting a roller 64 which rides on the cam 56. This switch is closed by depression of its arm 62. Reset switch 60 is closed by depression of a plunger 66 on the switch and opened by depression of a plunger 68. The switch has an actuator arm 70 which engages the cam 56 and is movable to depress the switch plunger 66 and thereby close the switch. Reset switch plunger 68 is depressed to open the reset switch 60 by an actuator arm 72 pivoted on a shaft 74 mounted on the dispenser frame base 30. Mounted on the reset switch is a normally closed stop switch 76 having a plunger 78 depressible by a switch actuating arm 80 to open the switch. Arm 80 is pivoted on shaft 74 and parallels the reset switch arm 72.

The food dispenser 14 has a pair of power leads 82, 84 for connection to an electrical power source, such as a standard 110 Volt wall receptacle. Lead 82 connects to one terminal of the food container drive motor 26 and one terminal of the clock motor 54. Lead 84 connects to one terminal of the clock motor and one terminal of the start switch 58. The other terminal of the start switch connects through lead 86 to one terminal of the reset switch 60 and one terminal of the stop switch 76. The other terminals of the latter switches connect to the other terminal of drive motor 26 through leads 87. Thus, the clock motor 54 is directly connected to the power leads 82, 84. Drive motor 26 is connected to the power leads through switches 58, 60, 76, switches 60, 76 being arranged in electrical parallel with one another and in electrical series with switch 58.

Cam 56 has a lobe 88 and is rotatable in the direction of the arrow if FIG. 8 to engage the lobe first with the start switch arm roller 64 to close the start switch 58. Shortly after the lobe 88 disengages the roller 64, to effect reopening of the start switch, the lobe engages the reset switch arm 70 to open the reset switch 60. Switch arms 72, 80 extend generally radially of the dispenser base 30 and have outer upturned ends 90, 92, respectively, which project upwardly through a top opening 94 (FIG. 2) of the base into the path of cams 96 mounted on and spaced about the lower end of the food container 18. These cams are equal in number to the compartments and are spaced uniformly about the container. Each cam 96 has a beveled leading end 98 which is engageable with the switch arm ends 90, 92 to depress the switch arms 72, 80 and thereby open reset switch 60 and open stop switch 76. Each cam also has a notch 100 in the path of switch arm end 90, whereby switch arm 70 is released upon entrance of the end 90 into the notch. Switch arm 80 is released to effect closure of the stop switch 76 upon disengagement of its end 92 from each cam. It is important to note that the switch arm ends 90, 92 are displaced along the circular path of the cams 96, whereby each cam first engages the end 92 of arm 80 to open the stop switch 76 and then the end 90 of arm 72 to open the reset switch 60.

When the timer circuit 28 is energized through the power leads 82, 84, the clock motor 54 is continuously powered to drive the cam 56 at a constant speed, such as one revolution every 24 hours. Assuming the cam to be in the position of FIG. 8, the start switch 58 is open and hence the drive motor 26 is deenergized. The food container 18 is thus stationary. The container is oriented so that in this position, one of its food compartments 20 is aligned with the dispensing opening 24 in the dispenser frame plate. At this time the cam 96 associated with the compartment in dispensing position engages and depresses the actuating arm 80 of the stop switch 76 to retain the latter open. The cam, however, does not engage the actuating arm 72 of the reset switch 60, since the upturned end 90 of the latter arm is located beyond the upturned end 92 of switch arm 80 and, as explained below, rotation of the cam with the food container 18 is terminated upon engagement of the cam with the end of arm 80 and before the cam engages the end of arm 72. Accordingly, the reset switch 60 is closed.

The food dispenser remains in this condition until the cam lobe 88 rotates into contact with and depresses the start switch actuating arm 62. This action closes the start switch 76 to energize the container drive motor 26 through the latter switch and the currently closed reset switch 60. Food container 18 is now driven by the motor 26 to advance the next container compartment toward the dispensing opening 22 and rotate the cam 96 out of engagement with the stop switch actuating arm end 92, thereby permitting return of the stop switch 76 to its normal closed position. During its rotation with the container, the cam rotates over the end 90 of the reset switch arm 72, thereby resetting the reset switch to its open condition. Rotation of the food container by the motor 26 continues until the following container cam 96 engages the stop switch arm 80 to open the stop switch 76 and thereby deenergize the motor. The cams 96 are positioned so that the container is arrested with the following food compartment 20 over the dispensing opening 24.

The came 56 rotates at a relatively slow speed compared to the food container 18. As a consequence, the start switch 58 will still be retained closed by the cam lobe 88 at the time arrival of the following food compartment 20 at dispensing position. However, since the reset switch 60 is open at the time of arrival, opening of the stop switch 76 by the cam 96 for the following compartment, as explained above, deenergizes the container drive motor 26 to arrest the container 18 in response to arrival of its following compartment 20 at dispensing position, as described. Continued rotation of the cam 56 eventually engages its lobe 88 with the reset switch arm 70 to reset the switch to closed condition. The above cycle of operation is repeated once during each revolution of the cam.

In use of the animal feeder 10, the power leads 82, 84 are connected to a suitable power source. An indicator light 102 is connected across the leads to indicate when the feeder is powered. The came 56 is then driven at a predetermined speed, typically one revolution every 24 hours. The food compartments 20 are filled with food, except for the compartment currently over the dispensing opening 24, by removing the dispenser cover 48.

Once every revolution of the cam 56, i.e., once every 24 hours, the drive motor 26 is energized in the manner described earlier to advance the following food compartment 20 of the food container 18 to dispensing position. Upon arrival in this position, the food in the compartment empties into the feeding dish 12. The particular feeder illustrated is designed to hold a seven-day supply of food and to dispense the food once each day. To this end, the food container 18 has eight food compartments 20, since the compartment over the dispensing opening 24 cannot be filled. Access to the motors 26, 54 and timer circuit 28 for servicing is provided by a hinged access door 104.

I claim:
1. The automatic animal food dispenser comprising:
a frame having a normally generally horizontal wall member containing a food dispensing opening,
a food container above said wall member having separate food compartments for receiving food to be dispensed, and each having a bottom opening closed by said wall member,
means mounting said container on said frame for movement of said compartments in succession through a dispensing position wherein the bottom opening of each compartment registers with said dispensing opening to effect emptying of the compartment contents through said dispensing opening into a feeding receptacle positioned below said dispensing opening,
a motor for driving said container in said movement, and
means for periodically energizing said motor to effect movement of said compartments to said dispensing position in succession at predetermined time intervals, said energizing means comprising switch means adapted to be actuated to energize and de-energize said motor, first switch actuating means for periodically actuating said switch means at preset time intervals to energize said motor at said intervals, and second switch actuating means movable in unison with said container for actuating said switch means to de-energize said motor upon arrival of each compartment at its dispensing position.

2. A dispenser according to claim 1 wherein:
said first switch actuating means comprises a clock motor and a rotary cam driven by said clock motor for periodically actuating said switch means to energize said motor, and said second switch actuating means comprises means mounted on said container and movable therewith for actuating said switch means to deenergize said motor in response to arrival of each compartment at said dispensing position.

3. A dispenser according to claim 2 wherein:
said switch means includes a start switch actuated by said cam and a stop switch actuated by said container mounted switch actuating means.

4. A dispenser according to claim 3 wherein:
said start switch is a normally open switch which is closed and then released to reopen by said cam and said stop switch is a normally closed switch which is opened by said container-mounted switch actuating means,
said switch means further comprises a reset switch which is opened by said container-mounted switch actuating means during each rotation of said container to a new dispensing position and closed by said cam following opening of said start switch upon release thereof by said cam and opening of said stop switch by said container-mounted switch actuating means at said new dispensing position, and arrival of each compartment at dispensing position, and
said reset and stop switches are arranged in electrical parallel with one another and in electrical series with said start switch and container drive motor.

5. A dispenser according to claim 4 4 wherein:
said container switch actuating means comprise cams spaced about said container, and
said reset and stop switches include actuating arms disposed for engagement by said cams.

6. A dispenser according to claim 5 wherein:
said frame has a hollow base below said container containing said drive motor and timer circuit,
said frame wall member is located atop said base,
said drive motor drives a shaft extending above said wall member, and
said container has a central opening receiving said shaft.

7. A dispenser according to claim 6 wherein:
said compartments open through the upper end of said container and said container has a cover which is removable for filling said compartments.

\* \* \* \* \*